Sept. 16, 1947.　　　K. W. HARPER　　　2,427,599
METHOD OF AND APPARATUS FOR POSITIONING
RETICULES IN OPTICAL INSTRUMENTS
Filed June 17, 1943　　　2 Sheets-Sheet 2
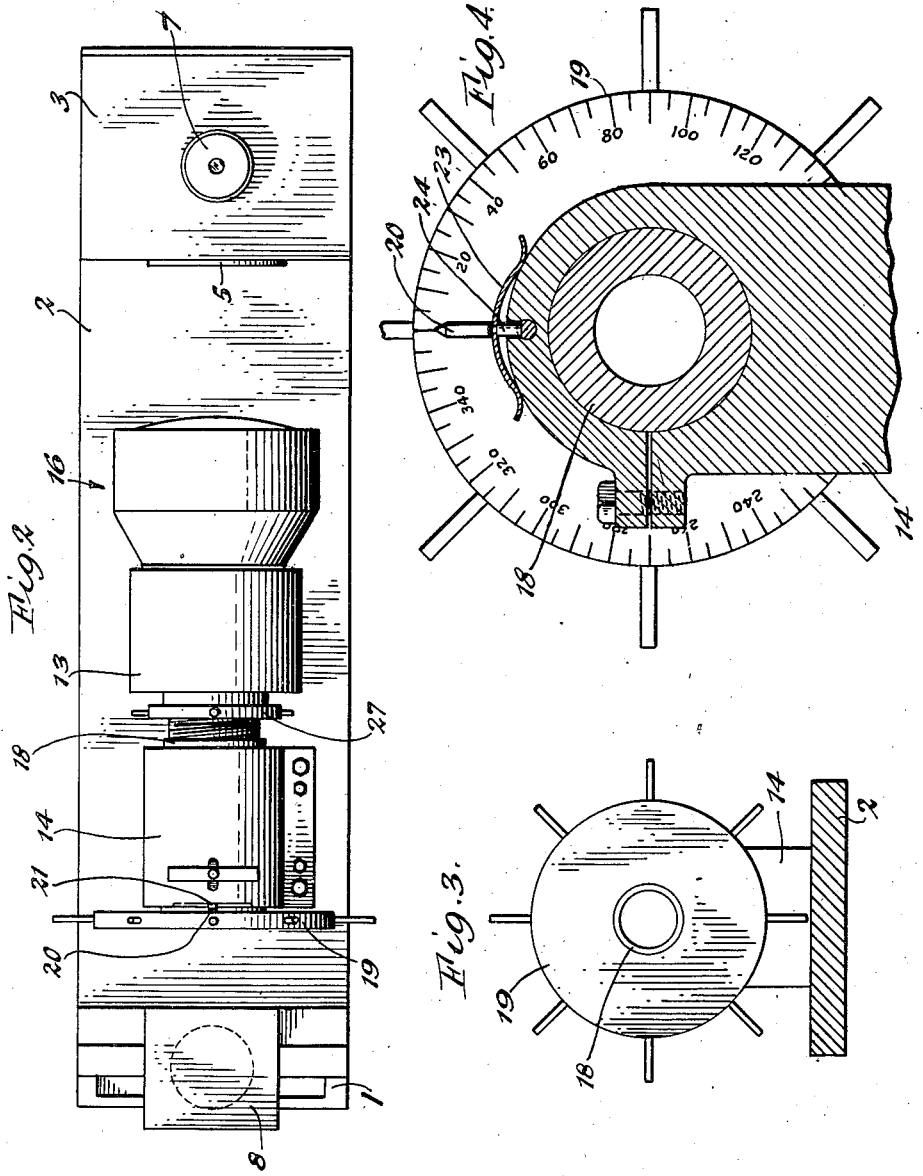
INVENTOR.
KENNARD W. HARPER
BY
Raymond A. Paquin
ATTORNEY Patented Sept. 16, 1947

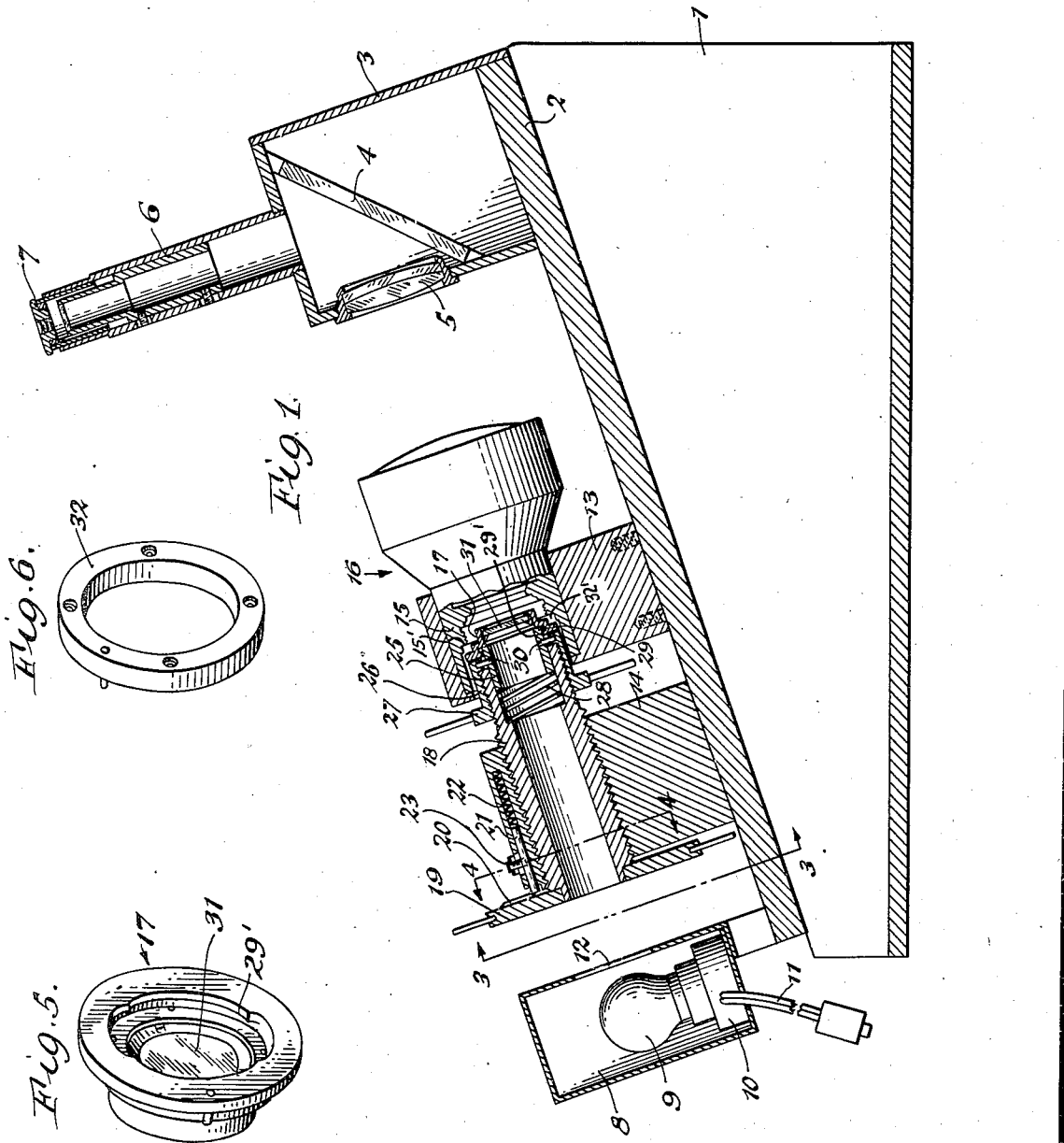

2,427,599

UNITED STATES PATENT OFFICE 2,427,599

METHOD OF AND APPARATUS FOR POSITIONING RETICULES IN OPTICAL INSTRUMENTS

Kennard W. Harper, East Aurora, N. Y., assignor, by mesne assignments, to American Optical Company, Southbridge, Mass., a voluntary association Application June 17, 1943, Serial No. 491,170

5 Claims. (Cl. 88—1)

1

This invention relates to a device for use in the construction of optical instruments and more particularly to a means and method for focussing elements thereof such as reticules and the positioning of such elements in proper spaced position in the optical systems of such instruments.

An object of the present invention is to provide a new and improved means and method for positioning elements such as reticules or the like in proper position in optical instruments.

Another object of the invention is to provide a new and improved means for determining the proper location of a reticule or the like relative to the other elements of an optical system.

Another object of the invention is to provide a new and improved means for determining the necessary position of a particular reticule or the like in an optical instrument in order that such reticule will be properly positioned relative to the other parts of the optical instrument.

Another object of the invention is to provide a new and improved device for determining the dimension of a spacing member to facilitate the positioning of a reticule or the like in proper optical relation with the other elements of an optical system.

Other objects and advantages of the invention will be apparent from the following description taken in connection with the accompanying drawings. It will be understood that many changes may be made in the details of construction, arrangement of parts, and steps of the process without departing from the spirit of the invention as expressed in the accompanying claims. I therefore, do not wish to be limited to the exact details of construction, arrangement of parts, and steps of the process shown and described as the preferred form has been shown by way of illustration only.

Referring to the drawings:

Fig. 1 is a sectional view of a device constructed according to the invention;

Fig. 2 is a top or plan view of the device shown in Fig. 1;

Fig. 3 is a sectional view taken on line 3—3 of Fig. 1 looking in the direction of the arrows;

Fig. 4 is a sectional view taken on line 4—4 of Fig. 1 looking in the direction of the arrows;

Fig. 5 is a perspective view of a reticule in its cell or support; and

Fig. 6 is a perspective view of one form of spacing ring that may be used in conjunction with the invention.

In the construction of optical instruments embodying reticules it is necessary that the reticule be properly positioned relative to the other elements of the optical system in order that such a reticule may function properly in conjunction therewith. To properly position such a reticule is a difficult operation as the location of the reticule, tolerances in manufacture of the various parts and the slight differences in the optical systems tend to affect the necessary position of such reticule therefore making it necessary that the reticule be located in proper position for the particular instrument in which it is to be employed.

The device shown in the drawings is intended for the purpose of indicating the correct location of a reticule and reticule supporting cell relative to the particular instrument with which such cell and reticule are to be used and determining the proper location of the reticule relative to the other elements of the optical system.

Referring more particularly to the drawings wherein similar reference characters designate corresponding parts throughout the several views, the device comprises a base 1 on which is secured a supporting plate 2. Adjacent one end of the plate 2 is the light tight housing 3 containing the mirror 4, objective lenses 5 and viewing telescope 6 having the focussing eyepiece 7.

The mirror 4 is supported within the housing 3 and is in such angular relation thereto that light entering said housing through the objective lens system 5 will be reflected into the telescopic viewing device 6.

Adjacent the opposite end of said support 2 is positioned the lamp housing 8 containing the light bulb or lamp 9 in the socket 10 and adapted to receive current through the leads 11. The lamp house has an opening 12 on the side thereof toward the instrument to be illuminated and if desired condensing lenses may be positioned in alignment with this opening.

Intermediate the lamp 9 and objective lens system 5 are positioned the upright support 13 which is secured to the plate or support 2 and the upright support 14 which is also secured to the support 2.

The support 13 has an opening therein of such size and shape as to receive the body portion 15 of the instrument 16 in which the reticule and cell 17 are to be located.

In order that the reticule cell may be accurately positioned within the body portion 15 the body portion 15 is tightly fitted into the opening in the upright support 13 in order to accurately locate this body for the fitting of the reticule cell therein.

Extending through the opening in the support 14 is the main block 18 which has a graduated flange 19 adjacent the outer end thereof and the indicator 20 is provided to indicate the amount of movement of said graduated flange 19.

The main block 18 is threaded in the support 14 and adapted to move in or out depending upon the direction of rotation of the flange 19 and, to allow the indicator 20 to also be adjusted simultaneously, the said indicator is mounted upon the end of the pin member 21 which is resiliently urged against the surface of the graduated flange 19 by means of the spring 22. The spring member 23 and pin 24 are provided to prevent rotation of said indicating member.

It is pointed out that the reticule cell 17 has a bayonet joint flange 29' adapted to be engaged by a cooperating flange 29 on the end of the support or supporting ring 25 and the cell may be locked thereon by means of this bayonet connection.

A locking ring 26 is threadably mounted on the outer surface of the forward end of the main block 18 and is adapted to be moved by means of the rim or wheel 27 for drawing the support 25 inwardly or allowing it to move outwardly depending upon the direction of turning of said member 27. The spring member 28 is provided to urge the support 25 outwardly of the interior of the main block 18 upon rotation of the threaded ring 26 in the proper direction. Rotation of the threaded member in the opposite direction will move the support 25 inwardly, compressing spring 28, as the reticule cell 17 is being clamped against the end of the main block 18.

After the reticule cell 17 has had its flange 29' engaged over the flange 29 on the forward end of the support 25 the member 27 is turned in such direction as to draw the support 25 and reticule cell toward the main block 18 until the reticule cell 17 engages the forward edge of the main block 18 as shown in Fig. 1. The pins 30 are fixedly carried by the supporting ring 25 and are positioned in longitudinally extending grooves formed in the forward end of the main block 18 so as to extend therethrough and into an internal annular groove formed in the locking ring 26. The pins 30 prevent rotation of the support 25 relative to the main block 18 and thus prevent rotation of the reticule cell 17 relative to the main block 18 as the reticule cell is drawn inwardly toward and against the end edge of the main block 18 by the rotation of the locking ring 26. The pins 30 also insure rotation of the reticule cell 17 and the support 25 with the main block 18 when the main block is rotated after the reticule cell 17 has been locked in position against the end of the main block 18 as previously described.

The apparatus just described may be used advantageously in the following manner. After the reticule cell 17 has been properly locked in place upon the end of main block 18, this block may be rotated until cell 17 is in engagement with the inner surface 15' (see Fig. 1) of the body portion 15. A reading is then taken on the graduated flange 19. The main block 18 and cell 17 are then moved away from this surface 15' a distance sufficient to bring the reticule of the reticule cell 17 into focus relative to the optical system of the body portion 15, thus creating an annular space 32' which space is to be subsequently occupied by the spacer 32. This focusing of the reticule with respect to the optical elements of body portion 15 is conveniently accomplished by sighting through the eye piece 7 of the telescope 6. A second reading is taken upon the graduated flange 19 while the reticule is retained in focus and the difference in these two readings may then be taken to indicate the thickness of the annular spacing ring 32 necessary to properly locate the particular reticule cell 17 relative to the body portion 15 of the instrument with which it is to be used, or the cell 19 can be graduated to read directly the necessary thickness of the spacing ring 32 to properly position the reticule cell relative to the instrument.

From the foregoing it will be seen that I have provided simple, efficient and economical means for obtaining all of the objects and advantages in the invention.

Having described my invention, I claim:

1. Optical checking apparatus comprising means for supporting in a predetermined position an optical instrument the proper positioning of whose reticule is to be observed, viewing means including an objective lens system for observing the position of the reticule of said instrument when in said predetermined position, said objective lens system being positioned in optical alignment with said instrument, and said objective lens system having its focal length predetermined so as to focus, when combined with the optical system of the instrument, at a position corresponding to the accurate location for said reticule in the instrument, and means for supporting said reticule in a position relative to the optical system of said optical instrument so as to be observed through said viewing means, said supporting means supporting said reticule independently of said optical instrument and being adjustable axially relative thereto so as to adjust said reticule to said accurate position in the optical system of said instrument.

2. Optical checking apparatus comprising means for supporting in a predetermined position an optical instrument the proper positioning of whose reticule is to be observed, viewing means including an objective lens system for observing the position of the reticule of said instrument when in said predetermined position, said objective lens system being positioned in optical alignment with said instrument, and said objective lens system having its focal length predetermined so as to focus, when combined with the optical system of the instrument, at a position corresponding to the accurate location for said reticule in the instrument, and means for supporting said reticule in a position relative to the optical system of said optical instrument so as to be observed through said viewing means, said supporting means supporting said reticule independently of said optical instrument and having an adjustment screw whose axis is parallel with the optical axis of said instrument for adjusting the position of said reticule along said axis and into said accurate position.

3. Optical checking apparatus as set forth in claim 2 in which the adjustment screw is provided with indicator means for indicating the axial movement of the adjustment screw and the reticule moved thereby.

4. Optical checking apparatus comprising means for supporting in a predetermined position an optical instrument the proper positioning of whose reticule is to be observed, viewing means including an objective lens system for observing the position of the reticule of said instrument when in said predetermined position, said objective lens system being positioned in optical alignment with said instrument, and said objective lens system having its focal length predetermined so as to focus, when combined with the optical system of the instrument, at a position corresponding to the accurate location for said reticule in the instrument, means for supporting said reticule in a position relative to the optical system of said optical instrument so as to be observed through said viewing means, said supporting means supporting said reticule independently of said instrument and having a hollow adjustment screw whose axis is parallel with the optical axis of said instrument for adjusting the position of said reticule along said axis and into said accurate position, said supporting means comprising an adjustable locking ring and a detachable bayonet connection for releasably engaging the reticule and clamping same in a fixed position on said supporting means, said adjusting screw being provided with an indicator means for indicating the axial movement thereof and thus the movement of the reticule moved thereby, and illuminating means positioned so as to project light through said hollow adjustment screw and onto said reticule, whereby said reticule may be observed through said viewing means and said instrument.

5. The method of mounting a reticule member in its proper location as a part of the optical system of an optical instrument comprising the steps of mounting the optical instrument in a fixed position in alignment with an optical sighting device which is so related to said optical system that a reticule correctly positioned in said instrument will be observed in focus in said sighting device, mounting the reticule member for movement relative to said optical instrument while being maintained in axial alignment with the optical system thereof, observing the reticule of said reticule member through the sighting device and the optical system of said instrument while adjusting said reticule so as to determine when the reticule has been moved into said correct position in said optical system, and assembling said optical instrument and said reticule member together with a spacer interposed therebetween and with the reticule member in contact with said spacer and said spacer in contact with the portion of the optical instrument adapted to be normally engaged thereby, the thickness of said spacer being equal to the distance between said correct position of said reticule member and said last mentioned portion of the optical instrument.

KENNARD W. HARPER.

REFERENCES CITED

The following references are of record in the file of this patent:

UNITED STATES PATENTS

| Number | Name | Date |
| --- | --- | --- |
| 1,863,384 | Terry | June 14, 1932 |
| 1,866,718 | Mihalyi | July 12, 1932 |
| 1,401,664 | Beman | Dec. 27, 1921 |